(12) United States Patent
Yin et al.

(10) Patent No.: US 10,575,074 B2
(45) Date of Patent: Feb. 25, 2020

(54) FAULT DETECTION METHOD AND DEVICE

(71) Applicant: Huawei Technologies Co., Ltd., Shenzhen (CN)

(72) Inventors: Jian Yin, Wuhan (CN); Wei Wang, Wuhan (CN); Peng Li, Shenzhen (CN); Fuxue Liu, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/153,201

(22) Filed: Oct. 5, 2018

(65) Prior Publication Data

US 2019/0045282 A1 Feb. 7, 2019

Related U.S. Application Data

(63) Continuation of application No. PCT/CN2016/078871, filed on Apr. 8, 2016.

(51) Int. Cl.
| | |
|---|---|
| *H04J 14/08* | (2006.01) |
| *H04Q 11/00* | (2006.01) |
| *H04J 3/14* | (2006.01) |
| *H04J 3/16* | (2006.01) |
| *H04L 1/00* | (2006.01) |
| *H04B 10/079* | (2013.01) |

(52) U.S. Cl.
CPC ..... *H04Q 11/0066* (2013.01); *H04B 10/0795* (2013.01); *H04J 3/14* (2013.01); *H04J 3/1652* (2013.01); *H04J 14/08* (2013.01); *H04L 1/0078* (2013.01); *H04J 2203/006* (2013.01); *H04J 2203/0062* (2013.01); *H04Q 2011/0081* (2013.01); *H04Q 2011/0083* (2013.01)

(58) Field of Classification Search
CPC ........ H04B 10/0795; H04J 14/08; H04J 3/14; H04J 3/1652
See application file for complete search history.

(56) References Cited

U.S. PATENT DOCUMENTS

| | | |
|---|---|---|
| 2007/0104485 A1 | 5/2007 | Zhang |
| 2007/0133397 A1 | 6/2007 | Bianchi et al. |
| 2007/0195832 A1 | 8/2007 | Liu |
| 2010/0074624 A1 | 3/2010 | Miller et al. |
| 2010/0135652 A1* | 6/2010 | Jiang ............... H04B 10/07 398/10 |

(Continued)

FOREIGN PATENT DOCUMENTS

| | | |
|---|---|---|
| CN | 1791057 A | 6/2006 |
| CN | 1983931 A | 6/2007 |

(Continued)

*Primary Examiner* — Dzung D Tran
(74) *Attorney, Agent, or Firm* — Slater Matsil, LLP

(57) ABSTRACT

A fault detection method and device is disclosed. The method includes obtaining, by an optical transport network (OTN) device, a first OTN frame. The first OTN frame includes a plurality of payload areas. Each payload area includes payload check information and payload data. The method further includes performing fault detection, according to the payload check information, of payload data of a payload area in which the payload check information is located. The first OTN frame is divided into a plurality of payload areas, and corresponding payload check information is carried in each payload area.

20 Claims, 13 Drawing Sheets

(56) References Cited

U.S. PATENT DOCUMENTS

| | | | | |
|---|---|---|---|---|
| 2010/0232786 A1* | 9/2010 | Aoki | ............. | H04J 3/1658 398/19 |
| 2011/0004700 A1* | 1/2011 | Sprague | ............. | H04J 3/1652 709/236 |
| 2011/0150468 A1* | 6/2011 | Uchida | ............. | H04J 3/1658 398/45 |
| 2014/0122978 A1 | 5/2014 | Kubo | | |

FOREIGN PATENT DOCUMENTS

| | | |
|---|---|---|
| CN | 101043309 A | 9/2007 |
| CN | 101656588 A | 2/2010 |
| CN | 104618057 A | 5/2015 |
| EP | 1742494 A1 | 1/2007 |
| EP | 2139160 A1 | 12/2009 |
| GB | 2495673 A | 4/2013 |
| WO | 2005099282 A1 | 10/2005 |
| WO | 2013084341 A1 | 6/2013 |

\* cited by examiner

| Column | | | | | | |
|---|---|---|---|---|---|---|
| Row | 1 ... 7 | 8 ... 14 | 15 16 17 ... | | 3824 | 3825 ... 4048 |
| 1 | Header alignment overheads | OTU overheads | | | | |
| 2 | ODU overheads | | OPU overheads | OPU payload | | FEC |
| 3 | | | | | | |
| 4 | | | | | | |

FIG. 4

| OH | Payload data 1 | Payload check information 1 | Payload data 2 | Payload check information 2 | ... | Payload data n−1 | Payload check information n−1 | Payload data n | Payload check information n |
|---|---|---|---|---|---|---|---|---|---|
| OH | Payload data n+1 | Payload check information n+1 | Payload data n+2 | Payload check information n+2 | ... | Payload data 2n−1 | Payload check information 2n−1 | Payload data 2n | Payload check information 2n |
| OH | Payload data 2n+1 | Payload check information 2n+1 | Payload data 2n+2 | Payload check information 2n+2 | ... | Payload data 3n−1 | Payload check information 3n−1 | Payload data 3n | Payload check information 3n |
| OH | Payload data 3n+1 | Payload check information 3n+1 | Payload data 3n+2 | Payload check information 3n+2 | ... | Payload data 4n−1 | Payload check information 4n−1 | Payload data 4n | Payload check information 4n |

FIG. 5B

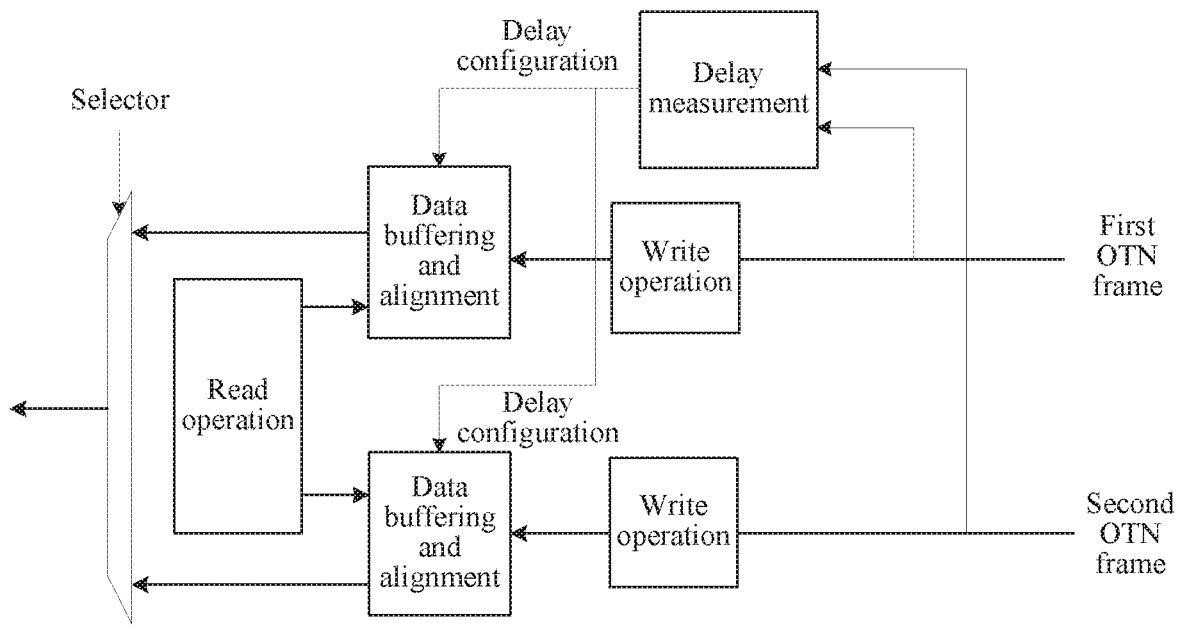

An optical transport network OTN device obtains a first OTN frame, where the first OTN frame includes at least two payload areas, and each of the at least two payload areas includes payload check information and payload data

S1202

Perform fault detection according to the payload check information, where the payload check information is used to check payload data of a payload area in which the payload check information is located

FIG. 12

FAULT DETECTION METHOD AND DEVICE

CROSS-REFERENCE TO RELATED APPLICATIONS

This application is a continuation of International Application No. PCT/CN2016/078871, filed on Apr. 8, 2016. The disclosure of the aforementioned application is hereby incorporated by reference in its entirety.

TECHNICAL FIELD

The present invention relates to the communications field, and in particular, to a fault detection method and device.

BACKGROUND

To quickly establish a radio network at low costs when there is no equipment room or an equipment room is not at an ideal location, a distributed base station solution is proposed. In this solution, a Radio Remote Unit (RRU) and a baseband control unit (BBU) are separated from each other by using a radio remote distribution technology, and are connected by using a fiber or a cable. Digitally sampled and quantized In-phase/Quadrature (I/Q) data is transmitted between the BBU and the RRU by using a Common Public Radio Interface (CPRI).

An Optical transport network (OTN) may be used as a bearer network between the BBU and the RRU. To enhance network reliability, the OTN generally performs service protection by using an active fiber and a standby fiber. As shown in FIG. 1, after being converged to an OTN device A, services of multiple RRUs are transmitted to an OTN device B by using a working trail. The OTN device B sends the received services to the BBU. If the working trail between the OTN device A and the OTN device B is faulty, the services may be switched to be transmitted by using a protection trail.

FIG. 2 is a schematic diagram of a fault detection manner of an OTN device in the prior art. As shown in FIG. 2, the OTN device detects a fault by using an optical module and an OTU overhead detection module, generates alarm information, and reports the alarm information to a protection switching control module. After receiving the alarm information, the protection switching control module switches a service from a working trail to a protection trail. It takes a relatively long time, which is generally at a millisecond level, from the moment when the working trail is faulty to the moment when the OTN device detects the fault and reports the alarm information. Consequently, protection switching efficiency is low.

SUMMARY

In view of this, embodiments of the present invention provide a fault detection method and device, to resolve a problem of low protection switching efficiency.

According to a first aspect, an embodiment of the present invention provides a fault detection method. The fault detection method includes obtaining, by an optical transport network (OTN) device, a first OTN frame. The first OTN frame includes at least two payload areas, and each of the at least two payload areas includes payload check information and payload data. The payload check information is used to check payload data of a payload area in which the payload check information is located. The fault detection method further includes performing, by the OTN device, fault detection on each payload area according to the payload check information. An OTN frame is divided into multiple payload areas, and each payload area carries respective payload check information, which is used to check payload data of the respective payload area, so that the OTN device can detect a fault when obtaining partial payload data, for example, at least one payload area, thereby improving efficiency of fault detection.

In a possible implementation manner of the first aspect, the first OTN frame includes 4*n payload areas, where n is a positive integer greater than or equal to 1. The first OTN frame may include 4 rows and n columns. For example, n may be 8. A payload area division manner of an OTN frame may be even division, or may be uneven division. Efficiency of fault detection is improved by performing detection on different areas.

In a possible implementation manner of the first aspect, the performing fault detection according to the payload check information includes: obtaining at least one payload area in the first OTN frame, and obtaining payload check information in each payload area, where each payload area corresponds to respective payload check information; and checking the corresponding payload area according to the respective payload check information. When obtaining the at least one payload area in the first OTN frame, the OTN device may perform fault detection, thereby improving efficiency of fault detection.

In a possible implementation manner of the first aspect, when an unchecked payload area still exists in the first OTN frame while the OTN device is performing fault detection according to the payload check information, the method further includes: obtaining the unchecked payload area in the first OTN frame. When performing fault detection on the first OTN frame, the OTN device may obtain the unchecked payload area in the first OTN frame, and can implement fault detection without receiving the complete first OTN frame, thereby improving efficiency of fault detection.

In a possible implementation manner of the first aspect, the payload check information is carried by using an idle fill column of the payload area. The payload check information is carried by using the idle fill column, so that an idle position in the OTN frame is fully used.

In a possible implementation manner of the first aspect, the payload check information is carried by using a reserved payload data column of the payload area, or the payload check information may be carried by using a reserved field of an overhead area. The payload check information may be carried in any manner, provided that the payload check information can correspond to payload data to be checked.

In a possible implementation manner of the first aspect, the method further includes: obtaining, by the OTN device, a second OTN frame, where the second OTN frame is obtained from a protection trail, and the first OTN frame is obtained from a working trail; and separately buffering the first OTN frame and the second OTN frame, where a buffer time is greater than or equal to a preset fault detection time. The buffer time of the first OTN frame and the buffer time the second OTN frame are set, so that in a fault detection period, that is, in a period from occurrence of the fault to reporting of the fault alarm information, service data is in a buffered state, thereby implementing lossless switching of a service.

In a possible implementation manner of the first aspect, the preset fault detection time is a time at which fault detection is performed according to the payload check information. Setting of the fault detection time enables an OTN frame to be in a buffered state before the OTN device completes fault detection, thereby implementing lossless switching of a service.

In a possible implementation manner of the first aspect, when the OTN device separately buffers the first OTN frame and the second OTN frame, the method further includes: obtaining, by the OTN device, a delay value between the first OTN frame and the second OTN frame, and aligning the first OTN frame with the second OTN frame according to the delay value. For example, if the first OTN frame is delayed by a time T compared with the second OTN frame, the buffer time of the second OTN frame is T greater than that of the first OTN frame. Setting of the buffer time may further enable two channels of service data to align with each other, thereby implementing lossless switching of a service.

In a possible implementation manner of the first aspect, the method further includes: when the first OTN frame does not detect a fault, selecting, by the OTN device, to receive the first OTN frame; and when the first OTN frame detects a fault, selecting, by the OTN device, to receive the second OTN frame. An OTN frame is transmitted on the working trail and the protection trail, thereby improving reliability of a service.

According to a second aspect, an embodiment of the present invention provides a fault detection device. The fault detection device includes a first optical module, and a payload check module. The first optical module is configured to obtain a first OTN frame. The first OTN frame includes at least two payload areas. Each of the at least two payload areas includes payload check information and payload data. The payload check module is configured to perform fault detection according to the payload check information. The payload check information is used to check payload data of a payload area in which the payload check information is located. An OTN frame is divided into multiple payload areas, and each payload area carries respective payload check information, which is used to check payload data of the respective payload area, so that the first optical module can detect a fault when obtaining partial payload data, for example, at least one payload area, thereby improving efficiency of fault detection.

In a possible implementation manner of the second aspect, the first OTN frame includes 4*n payload areas, where n is a positive integer greater than or equal to 1. The first OTN frame may include 4 rows and n columns. For example, n may be 8. A payload area division manner of an OTN frame may be even division, or may be uneven division. Efficiency of fault detection is improved by performing detection on different areas.

In a possible implementation manner of the second aspect, the device further includes an OTU frame-search module, configured to: obtain at least one payload area in the first OTN frame, and obtain payload check information in each payload area, where each payload area corresponds to respective payload check information; and the payload check module is configured to check the corresponding payload area according to the respective payload check information. When the OTU frame-search module obtains the at least one payload area in the first OTN frame, the payload check module may perform fault detection, thereby improving efficiency of fault detection.

In a possible implementation manner of the second aspect, the OTU frame-search module is further configured to: when an unchecked payload area still exists in the first OTN frame while the payload check module is performing fault detection according to the payload check information, obtain the unchecked payload area in the first OTN frame. When the payload check module performs fault detection on the first OTN frame, the OTU frame-search module may obtain the unchecked payload area in the first OTN frame, and can implement fault detection without receiving the complete first OTN frame, thereby improving efficiency of fault detection.

In a possible implementation manner of the second aspect, the payload check information is carried by using an idle fill column of the payload area. The payload check information is carried by using the idle fill column, so that an idle position in the OTN frame is fully used.

In a possible implementation manner of the second aspect, the payload check information is carried by using a reserved payload data column of the payload area, or the payload check information may be carried by using a reserved field of an overhead area. The payload check information may be carried in any manner, provided that the payload check information can correspond to payload data to be checked.

In a possible implementation manner of the second aspect, the device further includes a second optical module and a buffering alignment module, where the second optical module is configured to obtain a second OTN frame, where the second OTN frame is obtained from a protection trail, and the first OTN frame is obtained from a working trail; and the buffering alignment module is configured to separately buffer the first OTN frame and the second OTN frame, where a buffer time is greater than or equal to a preset fault detection time. The buffer time of the first OTN frame and the buffer time the second OTN frame are set, so that in a fault detection period, that is, in a period from occurrence of the fault to reporting of the fault alarm information, service data is in a buffered state, thereby implementing lossless switching of a service.

In a possible implementation manner of the second aspect, the preset fault detection time is a time at which the payload check module performs fault detection according to the payload check information. Setting of the fault detection time enables an OTN frame to be in a buffered state before the OTN device completes fault detection, thereby implementing lossless switching of a service.

In a possible implementation manner of the second aspect, the buffering alignment module is further configured to: obtain a delay value between the first OTN frame and the second OTN frame, and align the first OTN frame with the second OTN frame according to the delay value. For example, if the first OTN frame is delayed by a time T compared with the second OTN frame, the buffer time of the second OTN frame is T greater than that of the first OTN frame. Setting of the buffer time may enable two channels of service data to align with each other, thereby implementing lossless switching of a service.

In a possible implementation manner of the second aspect, the device further includes: a selector, configured to: when the first OTN frame does not detect a fault, select to receive the first OTN frame; and further configured to: when the first OTN frame detects a fault, select to receive the second OTN frame. An OTN frame is transmitted on the working trail and the protection trail, thereby improving reliability of a service.

According to a third aspect, an embodiment of the present invention provides an optical transport network (OTN) device, including an optical module and an OTN processing chip, where when the OTN device is running, the OTN processing chip executes preset program code, so that the OTN device performs the method according to any one of the first aspect or the possible implementation manners of the first aspect.

According to a fourth aspect, an embodiment of the present invention provides an optical transport network (OTN) device, including: a control and communications module, an optical module, and an OTN processing chip, where the control and communications module is connected to the optical module and the OTN processing chip, and is configured to configure the optical module and the OTN processing chip; and when the OTN device is running, the OTN processing chip executes the preset program code under the configuration of the control and communications module, so that the OTN device performs the method according to any one of the first aspect or the possible implementation manners of the first aspect.

According to the technical solutions provided in the embodiments of the present invention, an OTN frame is divided into at least two payload areas, payload check information is configured in each payload area and is used to check the payload area, so that fault detection can be performed quickly. In addition, service data may be buffered, so that the service data transmitted since occurrence of a fault to completion of protection switching is lossless.

BRIEF DESCRIPTION OF THE DRAWINGS

To describe the technical solutions in the embodiments of the present invention or in the prior art more clearly, the following briefly describes the accompanying drawings required for describing the background and the embodiments.

FIG. 4 is a frame schematic structural diagram of an OTN frame according to an embodiment of the present invention;

FIG. 5b is a schematic diagram of payload area division of an OTN frame according to an embodiment of the present invention;

FIG. 11 is a logical schematic structural diagram of a buffering alignment module according to an embodiment of the present invention;

FIG. 12 is a flowchart of an example of a fault detection method according to an embodiment of the present invention.

DETAILED DESCRIPTION OF ILLUSTRATIVE EMBODIMENTS

To make the objectives, technical solutions, and advantages of the present invention clearer and more comprehensible, the following further describes the present invention in detail with reference to the accompanying drawings and embodiments.

The embodiments of the present invention may be applied in a transport network, for example, an OTN. The OTN network in the embodiments of the present invention may be configured to carry a CPRI service, but the embodiments of the present invention are not limited to an application scenario of carrying the CPRI service.

Figure 1:
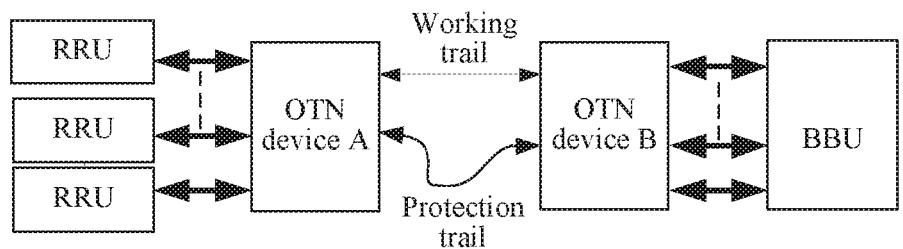
FIG. 1 is a network architectural diagram of an OTN that carries a CPRI service in the prior art.
Figure 2:
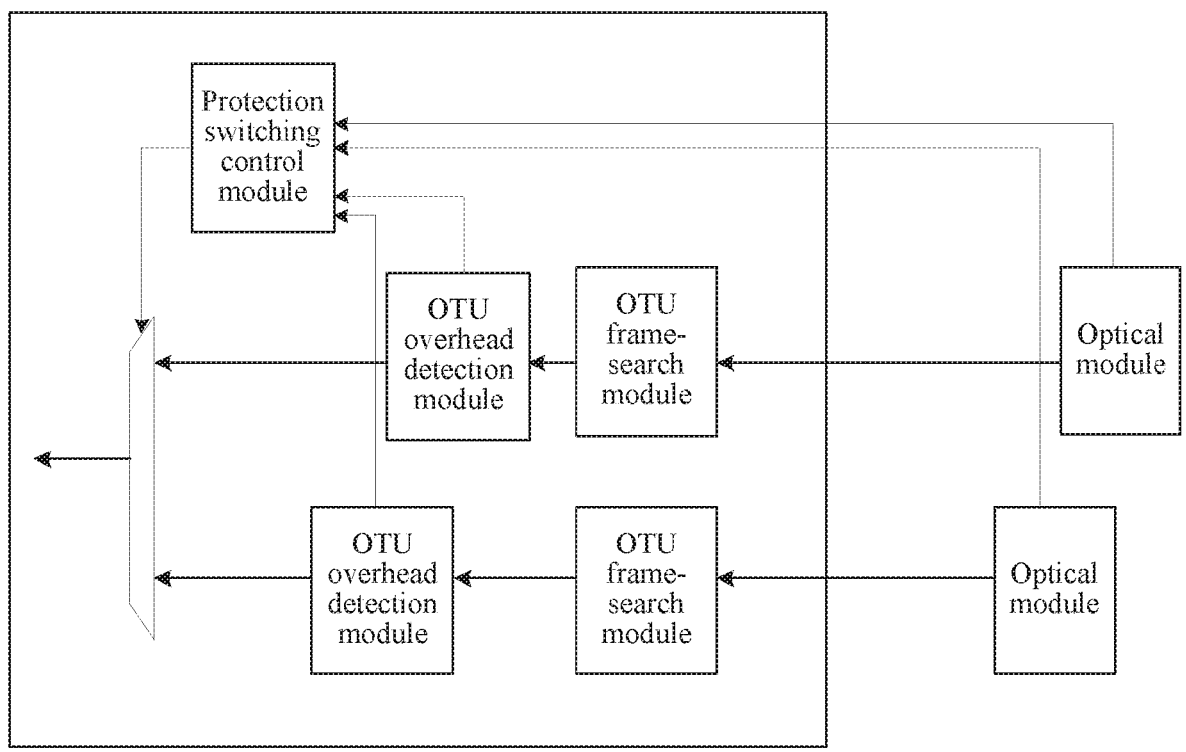
FIG. 2 is a schematic diagram of a fault detection manner of an OTN device in the prior art.
Figure 3A:
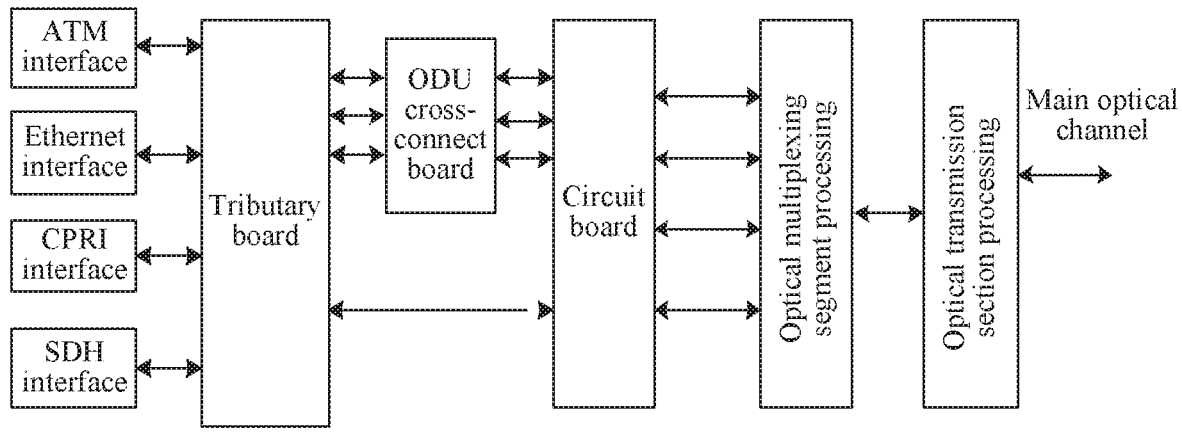
FIG. 3a is a schematic diagram of a hardware structure of an OTN device according to an embodiment of the present invention.
Figure 3B:
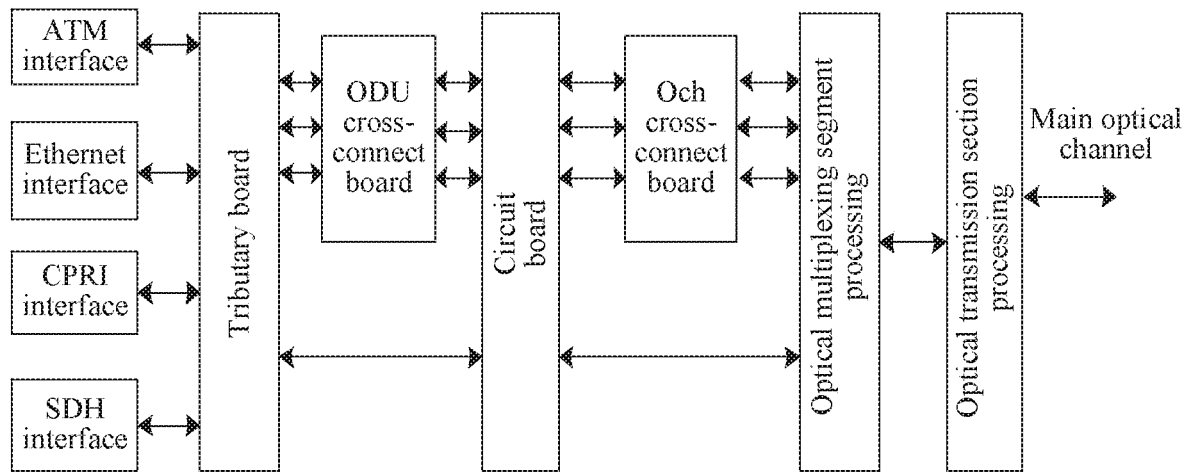
FIG. 3b is a schematic diagram of a hardware structure of an OTN device according to an embodiment of the present invention.

FIG. 3a and FIG. 3b are schematic diagrams of hardware structures of OTN devices according to embodiments of the present invention. As shown in FIG. 3a, the OTN device may provide multiple types of customer service interfaces, for example, an Asynchronous Transfer Mode (ATM) interface, an Ethernet interface, a CPRI interface, and a Synchronous Digital Hierarchy (SDH) interface. For example, a CPRI interface may be configured to connect to devices such as a BBU and a RRU. The OTN device may be an electrical cross-connect device, and completes an ODUk electrical cross-connection function by using an Optical Channel Data Unit (ODU) cross-connect board, where k may be 1, 1, 2, 3, 4, flex, or Cn, representing different rates. Certainly, a customer service may directly enter a circuit board from a tributary board without an ODU cross-connection. Optical multiplexing section processing board multiplexes multiple wavelength signals on the circuit board. The optical transmission section processing board sends the multiplexed multiple wavelength signals to a main optical channel.

The OTN device may be an optical cross-connect device, and completes Optical Channel (OCh) optical cross-connection by using an OCh cross-connect board. As shown in FIG. 3b, the OTN may be a photoelectric hybrid cross-connect device, that is, ODU electrical cross-connection is completed by using an ODU cross-connect board. In addition, the OCh optical cross-connection is completed by using an OCh cross-connect board. For example, for an ODU service, electrical cross-connection is performed by using the ODU cross-connect board, and for a wavelength-level service, optical cross-connection is performed by using the OCh cross-connect board. Optionally, the OTN device may include neither the ODU cross-connect board nor the OCh cross-connect board, that is, the OTN device is a terminal multiplexing device.

In the embodiments of the present invention, an OTN frame is divided into at least two payload areas, and each payload area carries respective payload check information, where the payload check information of each payload area is used to check payload data of the payload area, so as to detect whether a network is faulty. The technical solutions of the embodiments of the present invention may be applied in the OTN device in any one of the foregoing forms. This may reduce a fault detection time, and improve protection switching efficiency.

FIG. 4 is a frame schematic structural diagram of an OTN frame according to an embodiment of the present invention. As shown in FIG. 4, the OTN frame may be a structure of 4 rows and 4048 columns, including an overhead (OH) area, an Optical Channel Payload Unit (OPU) payload, and Forward Error Correction (FEC). The overhead area mainly includes: Optical Channel Transport Unit (OTU) overheads, ODU overheads, OPU overheads, and header alignment overheads. Optionally, the OTN frame may not include the FEC. The header alignment overheads are used to indicate a start location of the OTN frame, and include a Frame Alignment Signal (FAS) and a MultiFrame Alignment Signal (MFAS).

Figure 5A:
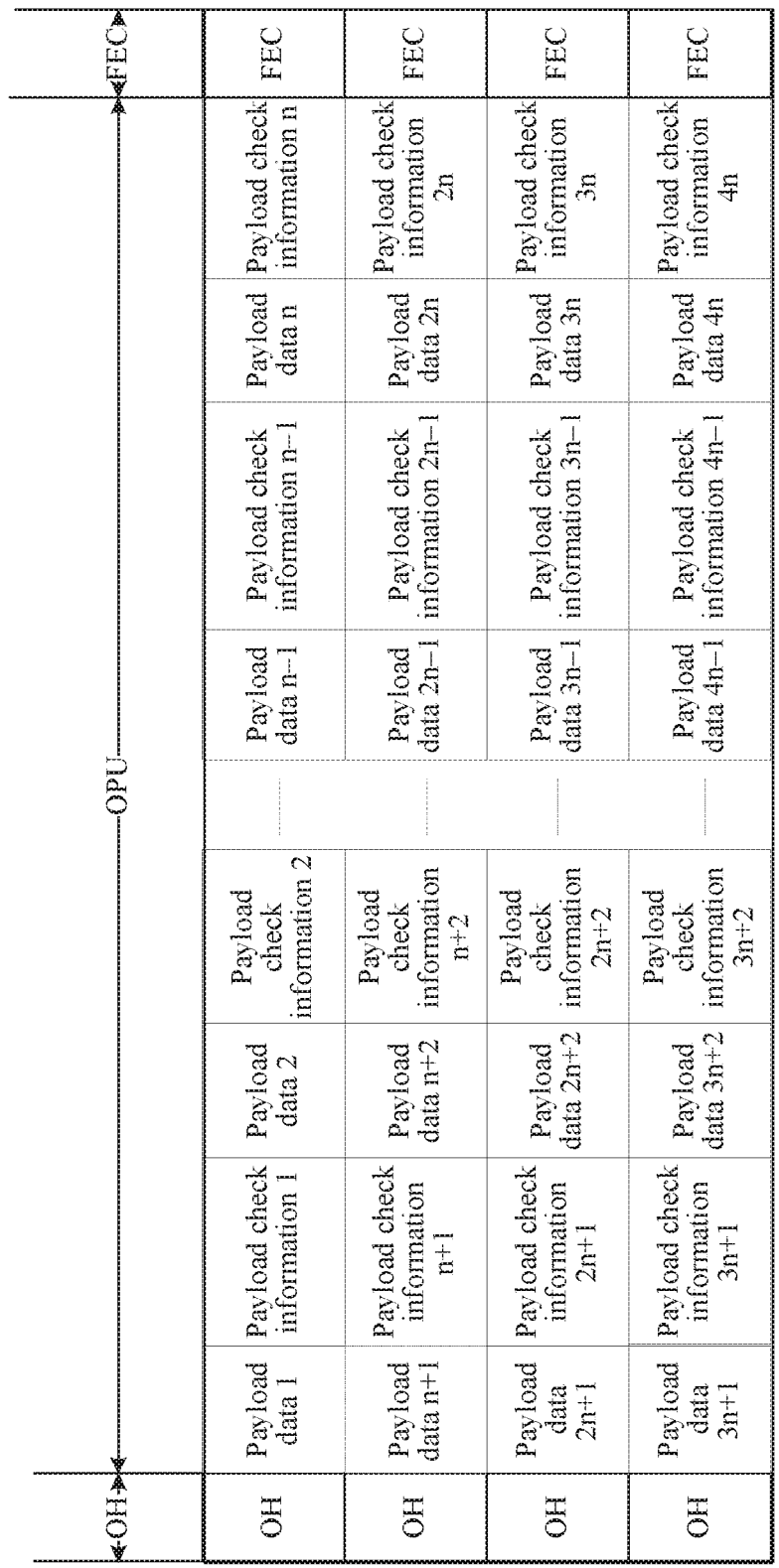
FIG. 5a is a schematic diagram of payload area division of an OTN frame according to an embodiment of the present invention.
Figure 6A:
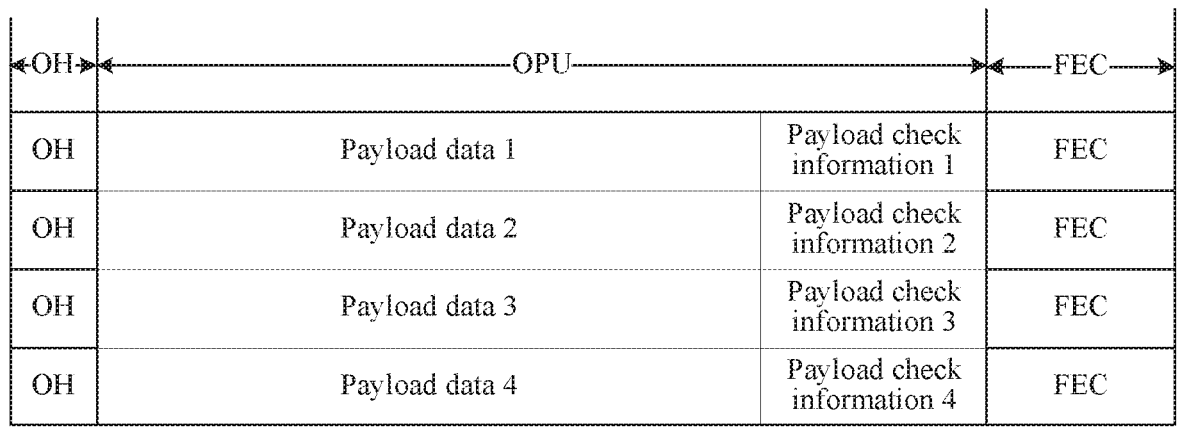
FIG. 6a is a schematic diagram of payload area division of an OTN frame according to an embodiment of the present invention.
Figure 6B:
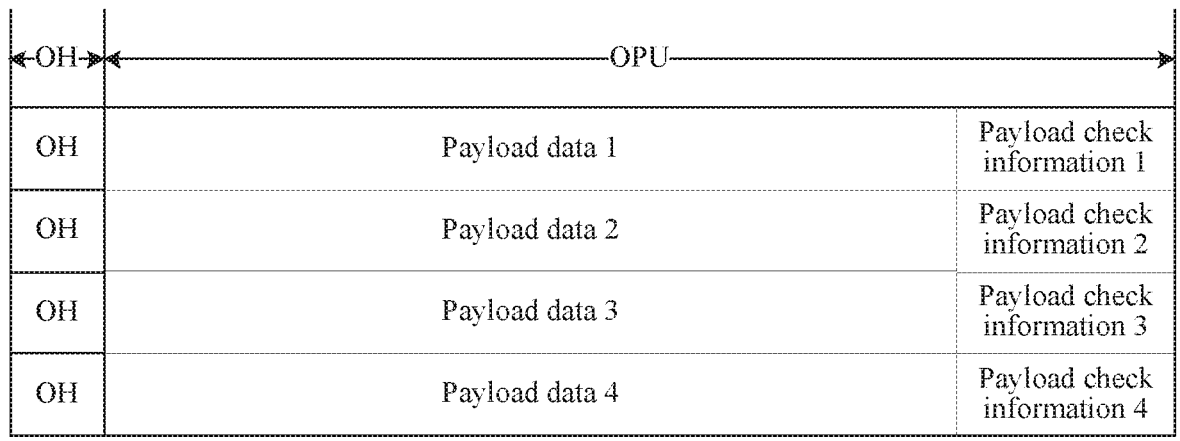
FIG. 6b is a schematic diagram of payload area division of an OTN frame according to an embodiment of the present invention.
Figure 7A:
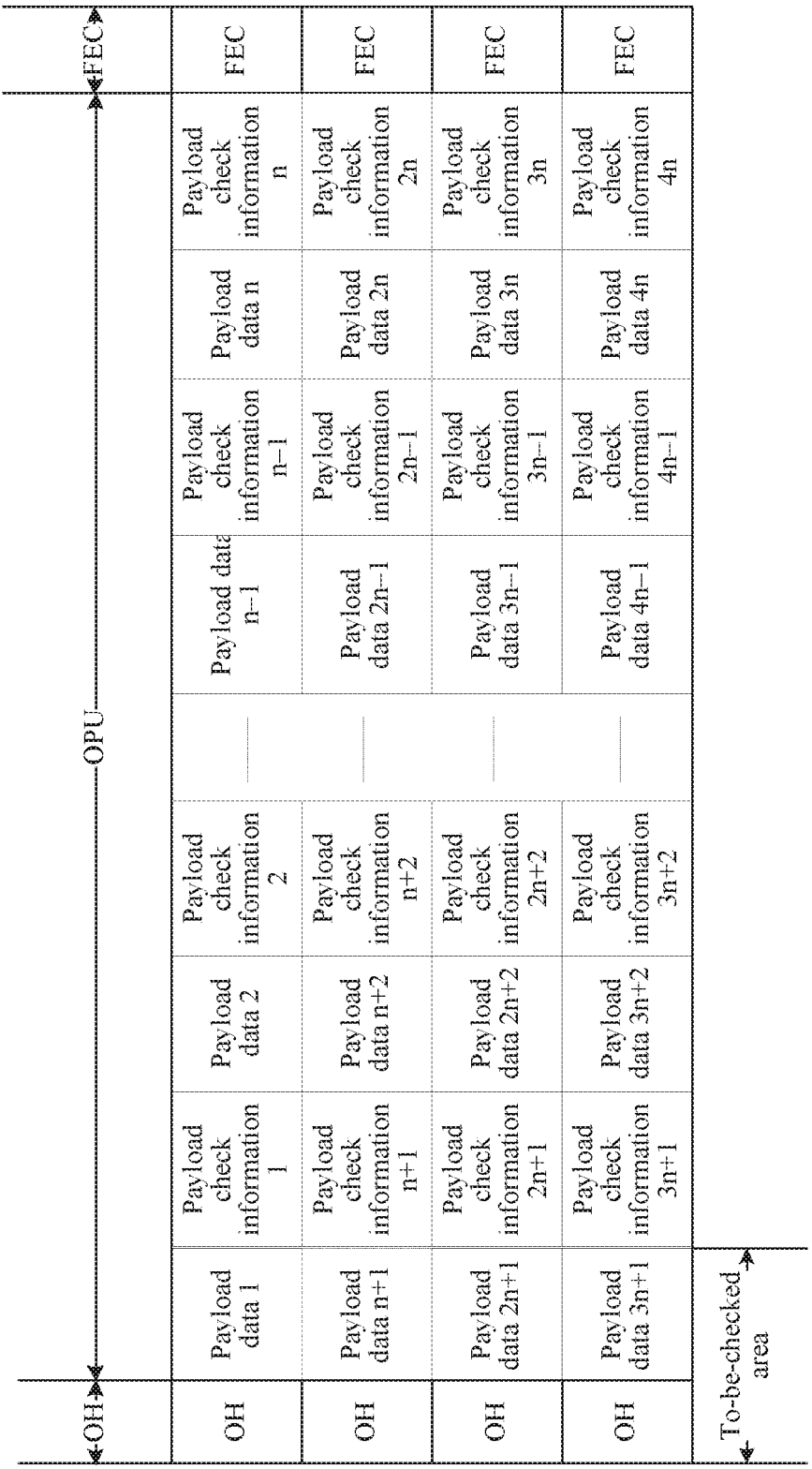
FIG. 7a is a schematic diagram of payload area division of an OTN frame according to an embodiment of the present invention.
Figure 7B:
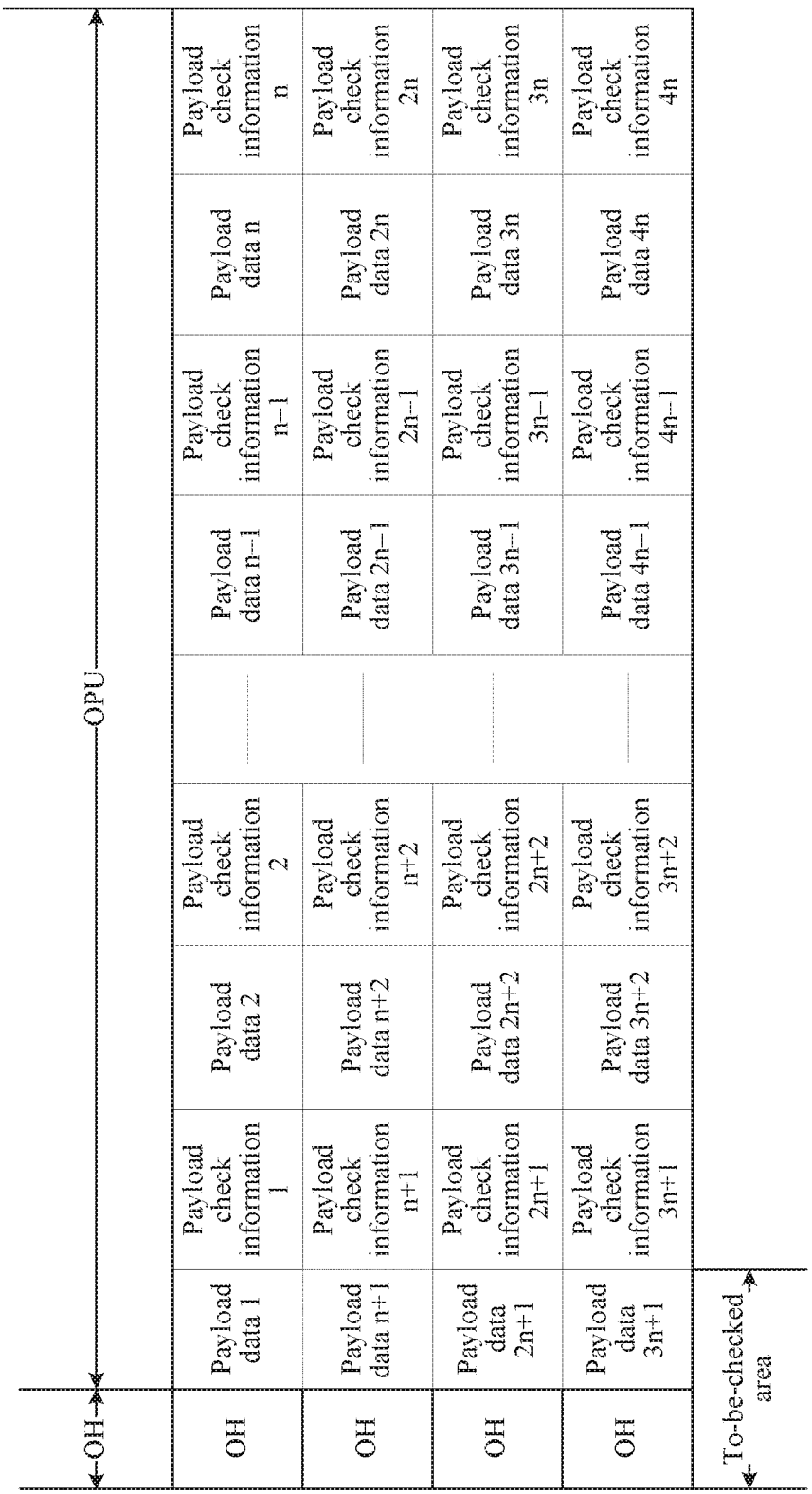
FIG. 7b is a schematic diagram of payload area division of an OTN frame according to an embodiment of the present invention.
Figure 8A:
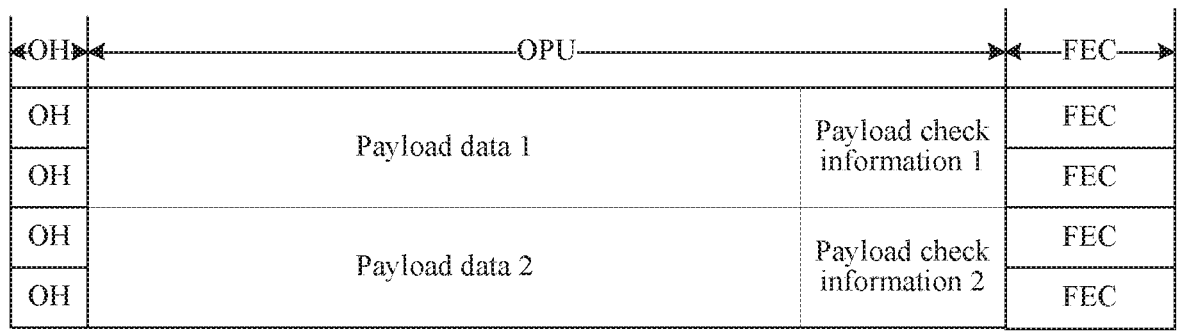
FIG. 8a is a schematic diagram of payload area division of an OTN frame according to an embodiment of the present invention.
Figure 8B:
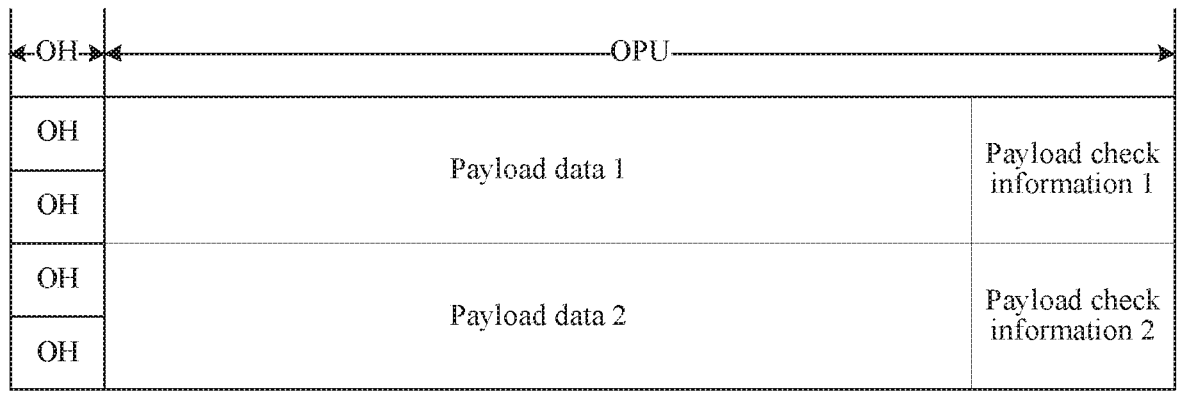
FIG. 8b is a schematic diagram of payload area division of an OTN frame according to an embodiment of the present invention.

FIG. 5a, FIG. 5b, FIG. 6a, FIG. 6b, FIG. 7a, FIG. 7b, FIG. 8a, and FIG. 8b are schematic diagrams of payload area division of an OTN frame according to embodiments of the present invention. An overhead (OH) area in the OTN frame in FIG. 5a to FIG. 8b may include: OTU overheads, ODU overheads, OPU overheads, and the like. An OPU payload area in the OTN frame may be divided into 4*n (n is a quantity of columns into which the OTN frame is divided) to-be-checked areas, for example, payload data 1, payload data 2, . . . , and payload data 4n in FIG. 5a. In addition, corresponding payload check information is added after each to-be-checked area, for example, payload check information 1, payload check information 2, . . . , and payload check information 4n in FIG. 5a. The payload check information 1 is used to check the payload data 1, the payload check information 2 is used to check the payload data 2, . . . , and the payload check information 4n is used to check the payload data 4n, where n is a positive integer greater than or equal to 1. For example, when n is equal to 8, an OPU payload area is divided into 32 to-be-checked areas. A difference between FIG. 5b and FIG. 5a is that the OTN frame in FIG. 5b does not include FEC. The OTN frame in FIG. 6a is the OTN frame in FIG. 5a when n is 1, that is, the OTN frame is divided into one column. A difference between FIG. 6b and FIG. 6a is that the OTN frame in FIG. 6b does not include FEC. A reserved bit in overheads (OH) of the OTN frame may further carry payload data. In this case, to-be-checked areas in the first column may further include overhead (OH) areas, for example, as shown in FIG. 7a and FIG. 7b. The OPU payload area in the OTN frame may be further divided into 2n (n is a quantity of columns into which the OTN frame is divided) to-be-checked areas. For example, as shown in FIG. 8a and FIG. 8b, when n is 1, that is, the OTN frame is divided into one column, the to-be-checked area includes payload data 1 and payload data 2, and corresponding payload check information is payload check information 1 and payload check information 2. Optionally, in this embodiment of the present invention, the OPU payload area of the OTN frame may be further divided into another quantity of to-be-checked areas, for example, n, 3n, or 5n (n is the quantity of columns into which the OTN frame is divided). A principle is similar to that of the foregoing embodiment, and details are not described herein again. The payload check information may occupy one byte, may be Cyclic Redundancy Code 8, (CRC8), Bit Interleaved Parity 8 code (BIP8), or the like, and is used to perform error detection on OPU payload data. The payload check information may be carried by using an idle fill column of an OPU, may be carried by using a reserved OPU payload data column, or may be carried by using a reserved field of an overhead area. The OTN frame may be evenly or unevenly divided into to-be-checked areas. Optionally, the payload check information may be set in a corresponding to-be-checked area, that is, before the payload data. This embodiment of the present invention is not limited to the foregoing listed payload area division manners of the OTN frame.

Figure 9:
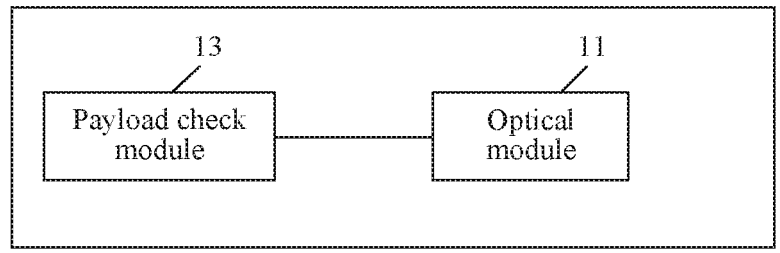
FIG. 9 is a schematic structural diagram of an OTN device according to an embodiment of the present invention.

FIG. 9 is a schematic structural diagram of an OTN device according to an embodiment of the present invention. The OTN device shown in FIG. 9 includes an optical module 11 and a payload check module 13.

The optical module 11 is configured to obtain a first OTN frame, where the first OTN frame includes at least two payload areas, and each of the at least two payload areas includes payload check information and payload data.

The optical module 11 is configured to perform optical-to-electrical conversion on received service data, to convert the service data to an OTN frame. The optical module 11 may receive the service data from customer equipment, and convert the service data to the first OTN frame. For example, if the customer equipment is a BBU or an RRU and the service data is a CPRI service, the optical module 11 converts the CPRI service to the first OTN frame. The optical module 11 may receive the service data from an upstream OTN device, and convert the service data to the first OTN frame. The first OTN frame may include an OTU frame, an ODU frame, an OPU frame, and the like. The first OTN frame may include different signal rates. For example, for OTUk, a value of k may be 1, 2, 3, and 4, and representing rates of 2.5 G, 10 G, 40 G, and 100 G respectively.

The first OTN frame may include at least two payload areas, and each payload area includes payload check information and payload data. The payload data is a to-be-checked area, and the payload check information is used to check the payload data. Payload area division may be implemented in any processing procedure of forming the OTN frame. Addition of the payload check information may also be implemented in any processing procedure of forming the OTN frame. For example, division and addition are implemented after a low order ODU is mapped to a high order OPU, or implemented in an overhead processing procedure of the OTN frame. Optionally, the first OTN frame includes 4*n payload areas, where n is a positive integer greater than or equal to 1. For a payload area division manner and a payload check information carrying manner of the first OTN frame, refer to the embodiments shown in FIG. 5a to FIG. 8b. Details are not described herein again.

The payload check module 13 is configured to perform fault detection according to the payload check information, where the payload check information is used to check payload data of a payload area in which the payload check information is located.

Fault detection of the OTN device may be implemented by using the payload check module 13. The first OTN frame may include at least two payload areas, and the payload data included in each payload area is a to-be-checked area. The payload data in the payload area may be checked by using the payload check information included in the payload area, so as to implement fault detection. For example, CRC8 check is performed on the first OTN frame. CRC8 processing is performed on the payload data of each payload area by using a byte as a unit, to obtain CRC8 check detection value. In addition, CRC8 payload check information is extracted from the checked payload data. The CRC8 check detection value obtained through CRC8 processing is compared with the extracted CRC8 payload check information to obtain whether the payload data is correct. For example, if the CRC8 check detection value and the extracted CRC8 payload check information are the same or a difference between the CRC8 check detection value and the extracted CRC8 payload check information is less than or equal to a preset threshold, the payload data is correct. When a bit error rate of the payload data reaches a particular value, alarm information may be reported. The bit error rate may be a bit error rate of one payload area, or may be an average value of bit error rates of multiple payload areas. Optionally, the payload data may be checked in a check manner such as BIP8. By means of separate processing on the payload areas of the OTN frame, when partial payload data of the OTN frame is received, check may be performed according to payload check information corresponding to the partial payload data without receiving the entire OTN frame, thereby improving efficiency of fault detection.

Figure 10A:
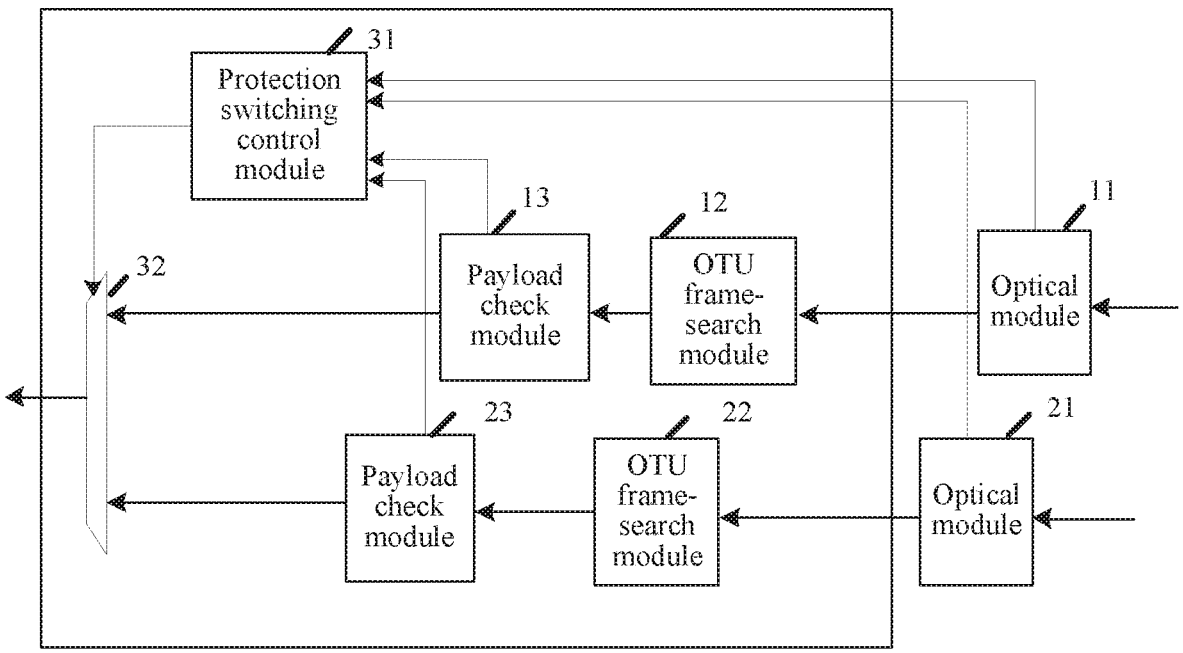
FIG. 10a is a schematic structural diagram of an OTN device according to an embodiment of the present invention.
Figure 10B:
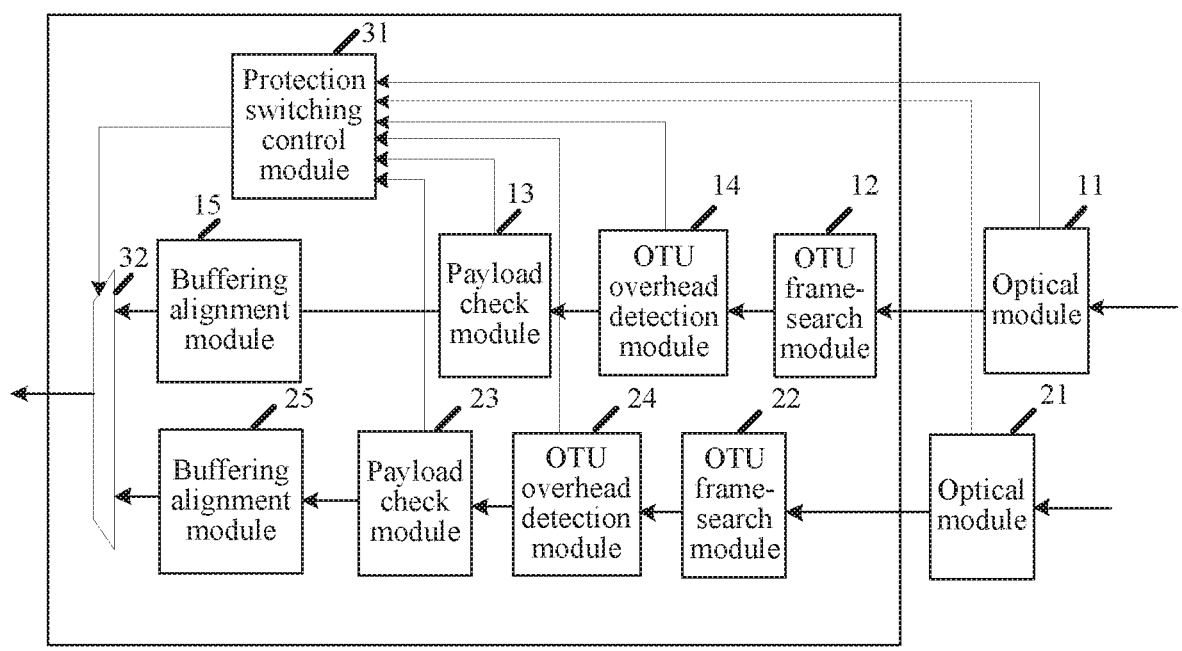
FIG. 10b is a schematic structural diagram of an OTN device according to an embodiment of the present invention.

The OTN device may protect the service data in an active-standby protection manner, for example, transmit the service data by using a working trail and a protection trail. FIG. 10a and FIG. 10b are schematic structural diagrams of an OTN device according to an embodiment of the present invention. As shown in FIG. 10a, an optical module 11, an OTU frame-search module 12, and a payload check module 13 may perform related processing on service data on the working trail. An optical module 21, an OTU frame-search module 22, and a payload check module 23 may perform related processing on service data on the protection trail. The OTN device may further include a protection switching control module 31 and a selector 32. The optical module 11 and the optical module 21 may be independent identical circuit modules or may be integrated into one circuit module. Likewise, the OTU frame-search module 12 and the OTU frame-search module 22 may be independent identical circuit modules or may be integrated into one circuit module, and the payload check module 13 and the payload check module 23 may be independent identical circuit modules or may be integrated into one circuit module.

Optionally, the OTU frame-search module 12 is configured to: obtain at least one payload area in a first OTN frame, and obtain payload check information in each payload area, where each payload area corresponds to respective payload check information; and the payload check module 13 is configured to check the corresponding payload area according to the respective payload check information. The OTU frame-search module 12 may search for a header alignment overhead pattern of the first OTN frame. Header alignment overheads may include at least one of an FAS or an MFAS. For example, a pattern of the FAS may be F6F62828. After the header alignment overhead pattern is found, that is, a header of the first OTN frame is found, the payload area of the first OTN frame may be located. If the header cannot be found, loss of frame (LOF) that represents a frame error may further be reported. When an unchecked payload area still exists in the first OTN frame while the payload check module 13 is performing fault detection according to the payload check information, the OTU frame-search module 12 may further obtain the unchecked payload area from the first OTN frame. When performing fault detection on the first OTN frame, the OTN device may receive another unchecked payload area in the first OTN frame, and can perform fault detection without receiving the complete first OTN frame, thereby improving efficiency of fault detection.

The optical module 11 is configured to obtain the first OTN frame. The optical module 21 may be configured to obtain a second OTN frame. The optical module 11 may receive the service data on the working trail. The optical module 21 may receive the service data on the protection trail. The second OTN frame is obtained from the protection trail. The first OTN frame is obtained from the working trail. The first OTN frame carries the service data on the working trail. The second OTN frame carries the service data on the protection trail. The service data carried in the first OTN frame and the second OTN frame may be the same. When the working trail is in a normal state, the service data may be received from the working trail by using the selector 32. When the working trail is faulty, the service data may be received from the protection trail by using the selector 32.

Optionally, as shown in FIG. 10b, fault detection of the OTN device may further be implemented by using one of or both the OTU overhead detection module 14 and the OTU overhead detection module 24, or may be implemented by using one of or both of the optical module 11 and the optical module 21. In this embodiment of the present invention, the OTU overhead detection module 14 and the optical module 11 are used an example for description. For example, after the OTU frame-search module 12 performs the OTN frame header alignment, the OTU overhead detection module 14 obtains overhead information of the first OTN frame, and checks the payload data of the entire first OTN frame according to the overhead information of the first OTN frame. For example, the overhead information of the first OTN frame may carry a BIP8 check value. The OTU overhead detection module 14 performs BIP8 check on the payload data. When OTU overhead detection is performed, a BIP8 check value of a current frame is set at an overhead location of the second frame following the current frame. Therefore, payload check can be implemented after the second frame following the current frame is obtained and received and after the payload data of the entire OTN frame is read. Therefore, compared with performing fault detection by using the payload check module 13, detection performed by using the OTU overhead detection module 14 has relatively low efficiency. The optical module 11 may determine whether a fault occurs by detecting whether an optical signal is received, and cannot detect the payload data in the OTN frame. The detection efficiency is also relatively low.

The protection switching control module 31 is configured to: receive fault alarm information from any one or more of the optical module 11, the optical module 21, the OTU overhead detection module 14, the OTU overhead detection module 24, the payload check module 13, or the payload check module 23, and send the fault alarm information to the selector 32. The selector 32 is configured to perform service data protection switching according to the received fault alarm information. For example, before receiving the fault alarm information, the selector 32 receives the service data from the working trail, and after receiving the fault alarm information, the selector 32 receives the service data from the protection trail. In this embodiment of the present invention, the optical module 11, the optical module 21, the OTU overhead detection module 14, the OTU overhead detection module 24, the payload check module 13, and the payload check module 23 are collectively referred to as fault detection modules. These modules may be independent circuit modules, or may be integrated into one circuit module. Optionally, a protection switching type may be configured for the protection switching control module 31 of the OTN device. For example, automatic switching or forced switching may be configured. If automatic switching is configured, protection switching is automatically performed according to the alarm information reported by the fault detection module. If forced switching is configured, forced switching may be performed in any preset case.

Optionally, to implement lossless switching of the service data in a protection switching process, buffering alignment may be further performed on the service data. A buffering alignment module 15 and a buffering alignment module 25 separately perform buffering alignment on the first OTN frame and a second OTN frame. For example, the buffering alignment module 15 may buffer data of the first OTN frame. The buffering alignment module 25 may buffer data of the second OTN frame. A buffer time is greater than or equal to a preset fault detection time. The buffering alignment module 15 and the buffering alignment module 25 are configured to: obtain a delay value between the first OTN frame and the second OTN frame, and perform delay setting for the first OTN frame and the second OTN frame according to the delay value, so that the first OTN frame is aligned with the second OTN frame. The fault detection time may be a fault detection time of any one of the optical module, the OTU overhead detection module, or the payload check module, may be a shortest fault detection time among fault detection times of multiple types of fault detection modules, or may be a time preset by a user.

FIG. 11 is a logical schematic structural diagram of a buffering alignment module according to an embodiment of the present invention. As shown in FIG. 11, delay measurement is separately performed on active service data and standby service data, for example, the first OTN frame and the second OTN frame. Then, delay configuration is performed on the two channels of service data, so that the two channels of service data are aligned after entering a buffer area. A delay measurement manner may be implemented by comparing a delay between header identifiers of the first OTN frame and the second OTN frame. The header identifier may be an FAS and/or an MFAS. By using the header identifier of the first OTN frame (for example, a location at which the FAS and the MFAS are O) as a start location, counting is started. When the header alignment identifier of the second OTN frame (for example, a location at which the FAS and the MFAS are O) arrives, counting is stopped, to obtain a count value t_cnt. If the count value t_cnt is less than half of a count period T, a delay value of a delay of the second OTN frame with respect to the first OTN frame is t_cnt. If the count value t_cnt is greater than half of a count period T, a delay value of a delay of the first OTN frame with respect to the second OTN frame is T−t_cnt. Delay configuration may be performed with reference to the delay value and fault detection times of the two channels of service data. For example, if the delay value of the delay of the first OTN frame with respect to the second OTN frame is t2, and the fault detection time is t1, a delay value configured for data buffering of the first OTN frame is t1, and a delay value configured for data buffering of the second OTN frame is t1+t2. Optionally, a delay value of xt may further be added to both the delay values configured for the two channels of service data, where xt may be a delay value configured by the OTN device, and is a reserved time generated for the fault alarm information. If a time for generating the fault alarm information is constantly t1, xt may be 0. Data alignment may be implemented by means of a write operation and a read operation on the buffered data. An implementation manner of the write operation on the buffered data may be: When input data is a header, the data is written to a preset address, and is written to a buffer area in ascending order of addresses. Headers of the two channels of data may be written to a same address, to ensure that data alignment. The buffer area may be implemented by using a random-access memory (RAM). A size of the buffer area is determined by the configured delay value. A larger delay value indicates a larger storage capacity of the buffer area. An implementation manner of the read operation on the buffered data may be: If there is data in a buffer area corresponding to a channel of service data currently selected by the selector, data is from a same address in buffer areas corresponding to the two channels of service data; or if there is no data in a buffer area corresponding to a channel of service data currently selected by the selector, no data is read. After the two channels of service data are read, the selector may select to receive one of the two channels of service data.

The OTN device shown in FIG. 9, FIG. 10a, and FIG. 10b may be an independent OTN device, or may be a circuit module in an OTN device, for example, is implemented on one or more of a tributary board, an ODU cross-connect board, a circuit board, an OCh cross-connect board, optical multiplexing section processing board, or optical transmission section processing board that are in the OTN device. In this embodiment of the present invention, the optical module, the OTU frame-search module, the payload check module, the OTU overhead detection module, the buffering alignment module, the protection switching control module, the selector, and the like may be implemented by using independent circuit modules, or may be implemented by using integrated circuit modules.

In this embodiment of the present invention, an OTN frame is divided into at least two payload areas. Each payload area includes payload check information and payload data. The payload check information in each payload area is used to check the payload data in the payload area, so as to implement fault detection. After at least one payload area of the OTN frame is obtained, payload check may be performed on the OTN frame, thereby improving efficiency of fault detection.

FIG. 12 is a flowchart of an example of a fault detection method according to an embodiment of the present invention. As shown in FIG. 12, the method may be performed by a transport device, for example, an OTN device. The method includes the following steps.

S1201: An optical transport network (OTN) device obtains a first OTN frame, where the first OTN frame includes at least two payload areas, and each of the at least two payload areas includes payload check information and payload data.

The OTN device may obtain the first OTN frame from customer equipment or the transport device. The customer equipment may be an ATM device, an SDH device, a CPRI device, or the like. The transport device may be an upstream OTN device.

For a data frame format of the first OTN frame, refer to the embodiments shown in FIG. 4 to FIG. 8b. The first OTN frame includes 4*n payload areas, where n is a positive integer greater than or equal to 1. The first OTN frame may include 4 rows and n columns of payload areas. For example, when n is 8, the first OTN frame includes 32 payload areas. Each payload area includes payload check information and payload data. The payload data is a to-be-checked area, and the payload check information is used to check the payload data. Optionally, the payload check information may be carried by using an idle fill column of the payload area, the payload check information may be carried by using a reserved payload data column of the payload area, or the payload check information may be carried by using a reserved field of an overhead area. For a payload area division manner and a payload check information carrying manner of the first OTN frame, refer to the embodiments shown in FIG. 5a to FIG. 8b. Details are not described herein again.

S1202: Perform fault detection according to the payload check information, where the payload check information is used to check payload data of a payload area in which the payload check information is located.

Fault detection of the OTN device may be implemented in any one of the following manners: Fault detection of the OTN device may be implemented by using payload check information carried in a payload area, may be implemented by using payload check information carried in an overhead area, or may be implemented by using a detection function of an optical module. When fault detection of the OTN device is implemented by using payload check information carried in a payload area, a payload area of an OTN frame may be divided into multiple to-be-checked areas for separate detection. When fault detection of the OTN device is implemented by using payload check information carried in an overhead area, a payload area of an entire OTN frame is detected as a whole, or a payload area of an OTN frame may be divided into multiple to-be-checked areas for separate detection. When detection is performed by using an optical module, whether a fault occurs may be determined by determining whether the optical module receives an optical signal. Payload check information may be a CRC8 check value, a BIP8 check value, or the like. Optionally, when performing fault detection according to the payload check information, the OTN device obtains at least one payload area in the first OTN frame, and obtains payload check information in each payload area, where each payload area corresponds to respective payload check information; and checks the corresponding payload area according to the respective payload check information. When an unchecked payload area still exists in the first OTN frame while the OTN device is performing fault detection according to the payload check information, the OTN device may further obtain the unchecked payload area in the first OTN frame. In this embodiment of the present invention, an OTN frame is divided into multiple payload areas. Fault detection may be implemented after partial payload data of the OTN frame, for example, at least one payload area, is obtained, thereby improving detection efficiency.

The OTN device may protect service data in an active-standby protection manner, obtain the first OTN frame form a working trail, and obtain a second OTN frame from a protection trail. Service data carried in the first OTN frame and the second OTN frame may be the same. When the first OTN frame does not detect a fault, the OTN device selects to receive the first OTN frame; and when the first OTN frame detects a fault, the OTN device selects to receive the second OTN frame. To implement lossless switching of the service data in a protection switching process, buffering alignment may be further performed on the service data. The OTN device obtains the first OTN frame and the second OTN frame, where the second OTN frame is obtained from the protection trail, and the first OTN frame is obtained from the working trail; and separately buffers the first OTN frame and the second OTN frame, where a buffer time is greater than or equal to a preset fault detection time. Optionally, the preset fault detection time is a time at which fault detection is performed according to the payload check information. Setting of the buffer time may further ensure alignment between two channels of data. The OTN device obtains a delay value between the first OTN frame and the second OTN frame, and aligns the first OTN frame with the second OTN frame according to the delay value. For example, if the first OTN frame is delayed by t2 compared with the second OTN frame, and the fault detection time is t1, a buffer time configured for the first OTN frame is t1, and a buffer time configured for the second OTN frame is t1 +t2.

The method shown in FIG. 12 may also be performed by the OTN device shown in FIG. 9, FIG. 10a, and FIG. 10b. For the steps shown in FIG. 12, refer to the steps performed by the modules of the OTN device shown in FIG. 9, FIG. 10a, and FIG. 10b. In this embodiment of the present invention, an OTN frame is divided into at least two payload areas. Each payload area includes payload check information and payload data. The payload check information in each payload area is used to check the payload data in the payload area, so as to implement fault detection. After at least one payload area of the OTN frame is obtained, payload check may be performed on the OTN frame, thereby improving efficiency of fault detection.

Figure 13:
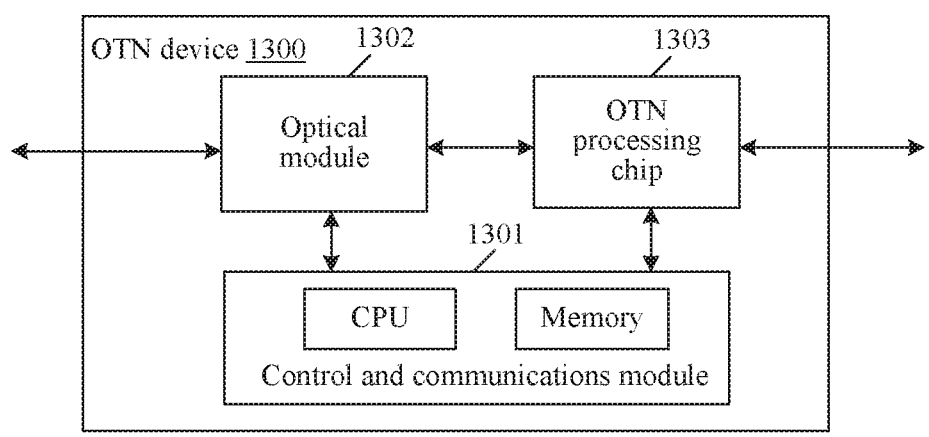
FIG. 13 is a schematic structural diagram of an OTN device according to an embodiment of the present invention.

FIG. 13 is a schematic structural diagram of an OTN device according to an embodiment of the present invention. As shown in FIG. 13, the OTN device 1300 includes: a control and communications module 1301, an optical module 1302, and an OTN processing chip 1303.

The control and communications module 1301 may include a central processing unit (Central Processing Unit, CPU) and a memory. The control and communications module 1301 is connected to the optical module 1302 and the OTN processing chip 1303, and may perform related configurations on the optical module 1302 and the OTN processing chip 1303, for example, configure a protection switching mode, configure an alarm detection time, and configure a clock rate. The control and communications module 1301 may perform some common configurations. This may be omitted in some application scenarios.

The optical module 1302 may be an optical transceiver, and include an optoelectronic device, a function circuit, an optical interface, and the like. The optoelectronic device may include: a semiconductor laser, a light emitting diode, an optical detection diode, and the like. The function circuit may include: a drive circuit, an optical power automatic control circuit, a modulation circuit, and the like. The optical module 1302 may be configured to: convert a received optical signal to an electrical signal, or convert an electrical signal to an optical signal. For example, the optical module 1302 is configured to obtain a first OTN frame, where the first OTN frame includes at least two payload areas, and each of the at least two payload areas includes payload check information and payload data. The optical module 1302 may perform optical-to-electrical conversion on received service data, to convert the service data to an OTN frame. The optical module in FIG. 9, FIG. 10a, and FIG. 10b may be a same circuit module as the optical module in FIG. 13.

The OTN processing chip 1303 may be implemented by using an application-specific integrated circuit (ASIC), a field-programmable gate array (FPGA), or at least one integrated circuit. The OTU frame-search module, the payload check module, the OTU overhead detection module, the buffering alignment module, the protection switching control module, the selector, and the like in FIG. 9, FIG. 10a, and FIG. 10b may be circuit modules disposed in the OTN processing chip 1303. The OTN processing chip 1303 may perform some specific processing, for example, may write program code to the OTN processing chip 1303, to implement the technical solution of this embodiment of the present invention. The OTN processing chip 1303 is configured to perform fault detection according to the payload check information, where the payload check information is used to check payload data of a payload area in which the payload check information is located. Optionally, the OTN processing chip 1303 is configured to: obtain at least one payload area in the first OTN frame, and obtain payload check information in each payload area, where each payload area corresponds to respective payload check information; and check the corresponding payload area according to the respective payload check information. When an unchecked payload area still exists in the first OTN frame while the OTN processing chip 1303 is performing fault detection according to the payload check information, the OTN processing chip 1303 may further obtain the unchecked payload area in the first OTN frame. Therefore, when fault detection is performed, other unchecked payload areas in the first OTN frame may be obtained. Fault detection can be implemented without receiving the complete OTN frame, thereby improving efficiency of fault detection.

Optionally, the first OTN frame includes 4*n payload areas, where n is a positive integer greater than or equal to 1. The payload check information may be carried by using an idle fill column of the payload area, may be carried by using a reserved payload data column of the payload area, or may be carried by using a reserved field of an overhead area.

The OTN device 1300 may protect service data in an active-standby protection manner, obtain the first OTN frame form a working trail, and obtain a second OTN frame from a protection trail. Service data carried in the first OTN frame and the second OTN frame may be the same. When the first OTN frame does not detect a fault, the OTN device selects to receive the first OTN frame; and when the first OTN frame detects a fault, the OTN device selects to receive the second OTN frame. To implement lossless switching of service data in a protection switching process, the OTN device obtains the first OTN frame and the second OTN frame by using the optical module 1302, where the second OTN frame is obtained from the protection trail, and the first OTN frame is obtained from the working trail; and separately buffers the first OTN frame and the second OTN frame, where a buffer time is greater than or equal to a preset fault detection time. Optionally, the preset fault detection time may be a time at which the OTN processing chip 1303 performs fault detection according to the payload check information. The OTN device 1300 obtains a delay value between the first OTN frame and the second OTN frame, and aligns the first OTN frame with the second OTN frame according to the delay value. The OTN processing chip 1303 may further include a read-only memory (ROM) and a RAM, buffering alignment may be performed on the two channels of service data by using the RAM. In an active-standby protection manner, the OTN device 1300 may include two or more optical modules 1302, or may include two or more OTN processing chips 1303. The first OTN frame and the second OTN frame may be processed by using different optical modules and OTN processing chips, or may be processed by using a same optical module and OTN processing chip. A buffer time is configured for the two channels of service data, and the buffer time is greater than or equal to the fault detection time. In addition, alignment of the two channels of service data is implemented by configuring the buffer time. Because in a fault detection period, that is, in a period from occurrence of the fault to reporting of the fault alarm information, the service data is in a buffered state, thereby implementing lossless switching of a service in a protection switching process.

In this embodiment of the present invention, an OTN frame is divided into at least two payload areas. Each payload area includes payload check information and payload data. The payload check information in each payload area is used to check the payload data in the payload area, so as to implement fault detection. After at least one payload area of the OTN frame is obtained, payload check may be performed on the OTN frame, thereby improving efficiency of fault detection.

The OTN device 1300 shown in FIG. 13 may implement the steps in the method embodiment shown in FIG. 12. It should be noted that, although the OTN device 1300 shown in FIG. 13 merely shows the optical module 1301, the control and communications module 1302, and the OTN processing chip 1303, in a specific implementation process, a person skilled in the art should understand that the OTN device 1300 further includes another component necessary for a normal operation, for example, a power module. In addition, a person skilled in the art should understand that the OTN device 1300 may further include, according to a specific need, a hardware component, such as a 1588v2 module, for implementing another additional function. In addition, a person skilled in the art should understand that the OTN device 1300 may include only a necessary component for implementing this embodiment of the present invention, but does not necessarily include all components shown in FIG. 13.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A fault detection method, comprising:
   obtaining, by an optical transport network (OTN) device, a first OTN frame, wherein the first OTN frame comprises a plurality of payload areas and each payload area carries payload data and payload check information; and
   for each of the payload area of the plurality of payload areas, upon transmission of the payload data, performing fault detection to determine a faulty working trail, by the OTN device, according to the payload check information, wherein performing the fault detection comprises checking the payload data for each of the payload area of the plurality of payload areas according to the payload check information located in the same payload area as the payload data being checked.

2. The method according to claim 1, wherein the first OTN frame comprises 4*n payload areas, wherein n is a positive integer greater than or equal to 1.

3. The method according to claim 1, wherein performing fault detection comprises:
   obtaining a payload area in the first OTN frame, and obtaining payload check information in the payload area, wherein the payload area corresponds to respective payload check information; and
   checking payload data in the corresponding payload area according to the respective payload check information.

4. The method according to claim 3, further comprising:
   obtaining an unchecked payload area in the first OTN frame, when the unchecked payload area still exists in the first OTN frame while the OTN device is performing fault detection according to the payload check information on another payload area in the first OTN frame.

5. The method according to claim 1, wherein the payload check information, which is in a payload area, is carried in an idle fill column of the payload area.

6. The method according to claim 1, wherein the payload check information, which is in a payload area, is carried in a reserved payload data column of the payload area.

7. The method according to claim 1, further comprising:
obtaining, by the OTN device, a second OTN frame, wherein the second OTN frame is obtained from a protection trail, and the first OTN frame is obtained from a working trail; and
separately buffering, by the OTN device, the first OTN frame and the second OTN frame, wherein a buffer time is greater than or equal to a preset fault detection time.

8. The method according to claim 7, wherein the preset fault detection time is a time at which fault detection is performed according to the payload check information.

9. The method according to claim 7, further comprising, after separately buffering the first OTN frame and the second OTN frame:
obtaining, by the OTN device, a delay value between the first OTN frame and the second OTN frame; and
aligning the first OTN frame with the second OTN frame according to the delay value.

10. A fault detection device, comprising:
a processor; and
a non-transitory computer-readable storage medium storing a program to be executed by the processor, the program including instructions to:
obtain a first Optical Transport Network (OTN) frame, wherein the first OTN frame comprises a plurality of payload areas, wherein each payload area carries payload data and payload check information configured to be used to determine a faulty working trail; and
for each of the payload area of the plurality of payload areas, upon transmission of the payload data, perform fault detection to determine a faulty working trail, according to the payload check information, wherein performing the fault detection comprises checking the payload data for each of the payload area of the plurality of payload areas according to the payload check information located in the same payload area as the payload data being checked.

11. The fault detection device according to claim 10, wherein the first OTN frame comprises 4*n payload areas, wherein n is a positive integer greater than or equal to 1.

12. The fault detection device according to claim 10, wherein the instructions to perform fault detection comprise instructions to:
obtain a payload area in the first OTN frame, and obtain payload check information in the payload area, wherein the payload area corresponds to respective payload check information; and
check payload data in the corresponding payload area according to the respective payload check information.

13. The fault detection device according to claim 12, wherein the program comprises further instructions to:
obtain an unchecked payload area in the first OTN frame, when the unchecked payload area still exists in the first OTN frame while fault detection is being performed according to the payload check information on another payload area in the first OTN frame.

14. The fault detection device according to claim 10, wherein the payload check information, which is in a payload area, is carried in an idle fill column of the payload area.

15. The fault detection device according to claim 10, wherein the payload check information, which is in a payload area, is carried in a reserved payload data column of the payload area.

16. The fault detection device according to claim 10, wherein the program comprises further instructions to:
obtain a second OTN frame, wherein the second OTN frame is obtained from a protection trail, and the first OTN frame is obtained from a working trail; and
separately buffer the first OTN frame and the second OTN frame, wherein a buffer time is greater than or equal to a preset fault detection time.

17. The fault detection device according to claim 16, wherein the preset fault detection time is a time at which fault detection is being performed according to the payload check information.

18. The fault detection device according to claim 16, wherein the program comprises further instructions to:
obtain a delay value between the first OTN frame and the second OTN frame; and
align the first OTN frame with the second OTN frame according to the delay value.

19. The fault detection device according to claim 18, wherein the program comprises further instructions to:
select to receive the first OTN frame, in response to no fault being detected in the first OTN frame; and
select to receive the second OTN frame, in response to a fault being detected in the first OTN frame.

20. A method, comprising:
receiving, by a first optical transport network (OTN) device, a first payload area of a plurality of payload areas in a first OTN frame that is transmitted by a second OTN device in a network with the first OTN device, wherein each payload area in the first OTN frame carries payload data and payload check information that relates to checking payload data of the payload area; and
performing fault detection to determine a faulty working trail on the first payload area that is received, according to the payload check information in the first payload area before receiving, by the first OTN device, another payload area of the plurality of payload areas, performing the fault detection comprises checking the payload data in the first payload area according to the payload check information located in the first payload area;
wherein payload data in each payload area comprises a portion of service data that is carried in the first OTN frame sent by the second OTN device to the first OTN device.

* * * * *